United States Patent
Horey et al.

(10) Patent No.: US 9,370,741 B2
(45) Date of Patent: Jun. 21, 2016

(54) FILTER RECONGNITION SYSTEM

(75) Inventors: Leonard Horey, Fort Lauderdale, FL (US); Otha Richardson, Boynton Beach, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 298 days.

(21) Appl. No.: 13/391,931

(22) PCT Filed: Aug. 25, 2010

(86) PCT No.: PCT/US2010/046582
§ 371 (c)(1),
(2), (4) Date: Feb. 23, 2012

(87) PCT Pub. No.: WO2011/031466
PCT Pub. Date: Mar. 17, 2011

(65) Prior Publication Data
US 2012/0151889 A1 Jun. 21, 2012

Related U.S. Application Data

(60) Provisional application No. 61/236,646, filed on Aug. 25, 2009.

(51) Int. Cl.
*B01D 46/10* (2006.01)
*B01D 46/00* (2006.01)

(52) U.S. Cl.
CPC .............. *B01D 46/10* (2013.01); *B01D 46/009* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,354,979 A | * | 10/1994 | Adelson et al. | 235/491 |
| 5,378,254 A | * | 1/1995 | Maly et al. | 96/418 |
| 5,413,097 A | * | 5/1995 | Birenheide et al. | 128/206.17 |
| 5,674,381 A | * | 10/1997 | Den Dekker | 210/85 |
| 5,772,732 A | * | 6/1998 | James et al. | 95/25 |
| 5,914,453 A | * | 6/1999 | James et al. | 95/14 |
| 6,186,140 B1 | * | 2/2001 | Hoague | 128/202.22 |
| 6,425,932 B1 | * | 7/2002 | Huehn et al. | 55/471 |
| 6,447,587 B1 | * | 9/2002 | Pillion et al. | 96/418 |
| 6,494,940 B1 | * | 12/2002 | Hak | 96/224 |
| 6,508,868 B2 | * | 1/2003 | Pillion et al. | 96/416 |
| 6,610,118 B2 | * | 8/2003 | Bryce et al. | 55/467 |
| 6,711,524 B2 | * | 3/2004 | Wolf et al. | 702/182 |
| 6,712,889 B2 | * | 3/2004 | Pillion et al. | 96/418 |
| 6,814,660 B1 | * | 11/2004 | Cavett | B01D 46/0005 454/284 |
| 6,863,704 B2 | * | 3/2005 | Pillion et al. | 55/471 |
| 6,894,620 B2 | * | 5/2005 | Reinhardt | B01D 46/0086 340/606 |
| RE39,361 E | * | 10/2006 | Den Dekker | B01D 35/143 210/100 |

(Continued)

FOREIGN PATENT DOCUMENTS

| | | | |
|---|---|---|---|
| DE | 10000435 A1 | * | 7/2001 |
| JP | 2000279735 | * | 10/2000 |

(Continued)

*Primary Examiner* — Duane Smith
*Assistant Examiner* — Sonji Turner
(74) *Attorney, Agent, or Firm* — Seth M. Blum

(57) ABSTRACT

A filter recognition system for use with an air purifier is provided. The air filter assembly or filter clip includes identification pins/taps which are read by the air purifier to determine the filter type. The filter recognition system adjusts the motor parameter based on the filter type. Additionally, the filter recognition system adjusts the filter timer to automatically communicate to a user the recommended time to change the filter based on the identified filter type.

19 Claims, 13 Drawing Sheets

(56) References Cited

U.S. PATENT DOCUMENTS

| | | | | |
|---|---|---|---|---|
| 7,276,100 B2 * | 10/2007 | Huehn et al. | | 55/471 |
| 8,539,778 B2 * | 9/2013 | Hofhaus | B01D 46/009 | 62/317 |
| 2003/0025598 A1 * | 2/2003 | Wolf | B01D 29/07 | 340/457.4 |
| 2003/0052791 A1 * | 3/2003 | Reinhardt | B01D 46/0086 | 340/607 |
| 2005/0284116 A1 * | 12/2005 | Duffy | B01D 46/0001 | 55/497 |
| 2006/0192570 A1 * | 8/2006 | Dworatzek | B01D 46/0086 | 324/699 |
| 2008/0087589 A1 * | 4/2008 | Grzonka et al. | | 210/91 |
| 2008/0295685 A1 * | 12/2008 | Uhland et al. | | 95/25 |
| 2009/0183636 A1 * | 7/2009 | Levine et al. | | 96/397 |

FOREIGN PATENT DOCUMENTS

| | | | | |
|---|---|---|---|---|
| JP | 2000279735 A | * | 10/2000 | B01D 46/42 |
| JP | 2007190506 | * | 8/2007 | |
| JP | 2007190506 A | * | 8/2007 | |
| WO | WO 0152185 A2 | * | 7/2001 | |
| WO | WO 0152185 A3 | * | 12/2001 | |

* cited by examiner

| FILTER DESCRIPTION | TAB DESIGNATION |
|---|---|
| BASIC CHEAP FILTER TO BE INCLUDED IN UNITS | 1 2 3 (tabs at 1, 2, 3) |
| ODOR FILTER | 1 2 3 (tabs at 1, 2) |
| STANDARD HAPF30 FILTER | 1 2 3 (tabs at 2, 3) |
| STANDARD HAPF300 FILTER | 1 2 3 (tabs at 1, 3) |
| HAPF300 FILTER W/AQUASTAT | 1 2 3 (tab at 1) |
|  | 1 2 3 (tab at 2) |
| EXPANDED MEDIA FILTER | 1 2 3 (tab at 3) |
| WASHABLE FILTER W/SILVER NETTING | 1 2 3 (no tabs) |

FIG 6

FILTER RECONGNITION SYSTEM

FIELD OF THE INVENTION

The invention relates to air purifiers, and more specifically to an air filter assembly for use in an air purifier, where the air filter assembly includes an air filter identifier used to indicate the type of filter element installed in the air purifier.

BACKGROUND OF THE INVENTION

Portable air purifiers for removing airborne particles are used in many homes and offices. Such purifiers often include a fine particle high efficiency particulate air (HEPA) filter. In addition to a HEPA filter, some purifiers include a carbon filter to remove odors, or other filter types. The carbon may be incorporated within a fibrous matrix. A filter for trapping relatively large particles may also be found in portable air purifiers. In operation, one or more fans cause air to be drawn through the filter(s) and emitted through an outlet.

To increase the efficiency and performance of the air purifier the operational parameters of the air purifier can be matched with the properties of the installed filter. For example, by adjusting the air flow to match the install filter type the performance of the air purifier can be optimized.

Additionally, the ability to communicate to a user the recommended time to change the filter will allow for maintaining the optimized performance of the system. This is normally communicated through a color LED display on the control panel of the unit.

SUMMARY OF THE INVENTION

The filler recognition system of the present disclosure is a system by which an air purifier appliance recognizes the type of filter that is placed inside the unit and adjusts the logic and functional parameters of the unit dictated by the interface. Two key logic components include the filter change timer and the motor speed.

Through the filter recognition system, the filter timer will be adjusted automatically to communicate to the consumer the recommended time to change the filter based on a specific pre-determined algorithm written into the PCBA (i.e., Printed Circuit Board Assembly). This is normally communicated through a color LED display on the control panel of the unit. The recommended times to change the filter would be specific for the filter type based on test data from the vendor.

The filter recognition system will also adjust motor parameters based on the filter type. It has been determined that in order to maximize the performance of filters and an air purifier system, the density of the filter media must be closely matched with the air flow within the system. By closely matching the air speeds with the filter type, the entire system may be optimized for performance. It is also anticipated that energy consumption may be minimized by dialing in a 'filter specific' operating range, thus controlling the wattage.

An air filter assembly for use with an air purifier of the present disclosure can include frame having an outer surface defining a cavity. A filter element is positioned within the cavity of the frame. Filter identifiers can be positioned on the outer surface of the frame; wherein the filter identifier is readable by the air purifier.

The filter identifiers can be protrusions (pins) molded on a filter clip to interface with tact switches embedded on the back housing of the air purifier. The actual interface may be a keyed or contact mechanism allowing for seven or more combinations of filters.

Alternatively, the filter identifiers can be rib (tab like) structures molded on the filter frame to engage a contact switch embedded on the back housing of the air purifier. The actual interface may be a keyed or contact mechanism allowing for seven or more combinations of filters.

It is also envisioned that the filter identifiers can be a RFID (i.e., Radio Frequency Identification Device) tag may be embedded on any combination of filter and the back housing of the air purifier such that they are opposed and capable of communicating a recognition signal to the PCBA for a range of filter operating modes.

As such, in combination, the present disclosure recites an air purifying device having a housing including an air inlet and an air outlet. A fan including a motor and a fan blade are positioned within the housing for drawing air into said housing through said air inlet and expelling air through said air outlet. A filter recognition system is incorporated in to the housing. A filter assembly is positionable within said housing between said air inlet and the fan. The filter assembly includes at least one filter identifier readable by the filter recognition system.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 6 depicts a filter type pin/tab designation chart;

DETAILED DESCRIPTION OF THE INVENTION

The present disclosure relates to a filter recognition system for use with an air purifier. Specifically, the air filter includes identification pins/tabs which are read by the air purifier to determine the filter type. The filter recognition system adjusts the motor parameters based on the filter type. Additionally, the filter recognition system adjusts the filter timer to automatically communicate to a user the recommended time to change the filter based on the identified filter type.

Figure 1:
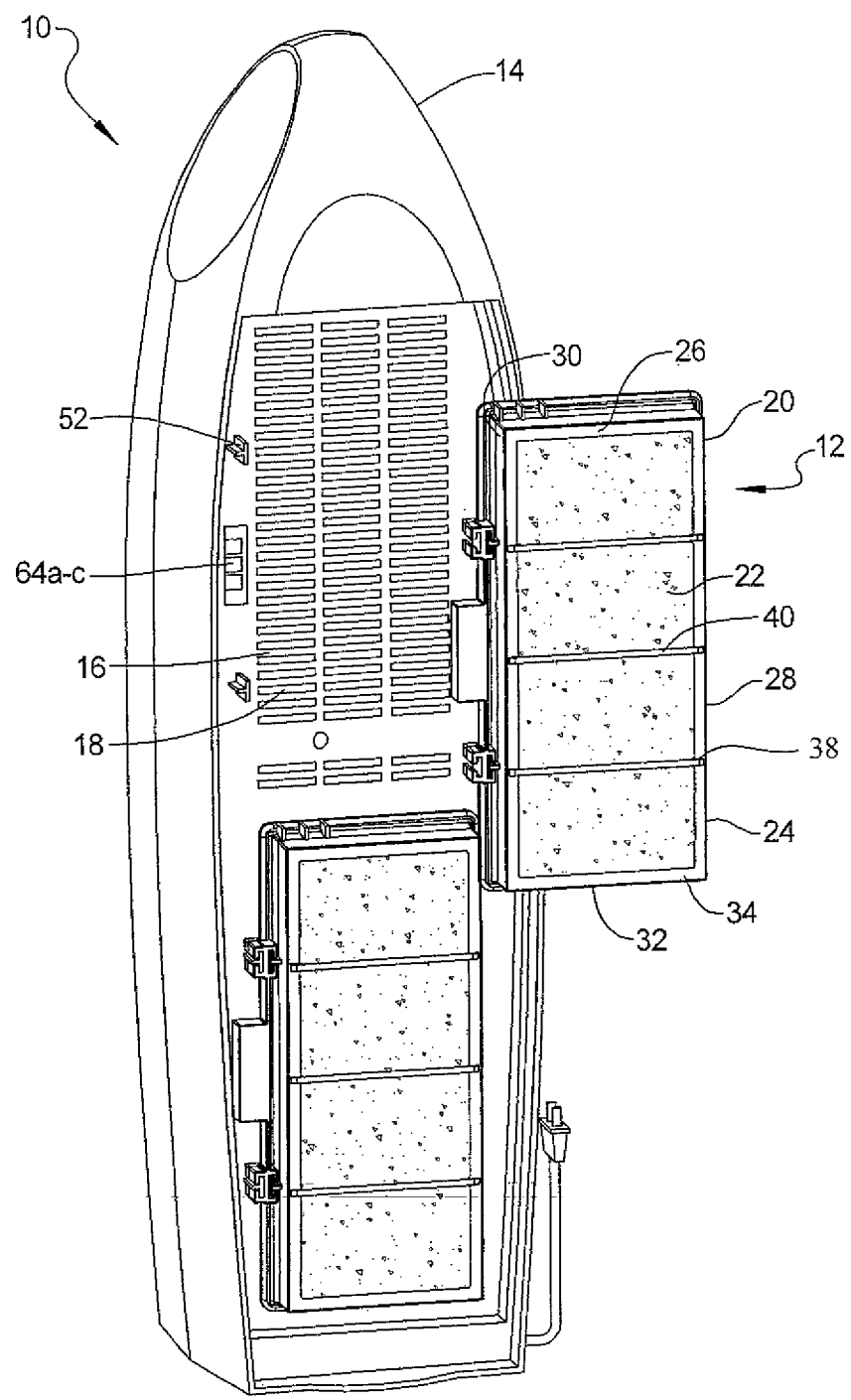
FIG. 1 depicts an air purifier including a filter assembly of the present disclosure.

Referring to the drawing figures in which like reference designators refer to like elements, there is shown in FIG. 1 and exemplary air purifier 10 including at least one air filter assembly 12. The air purifier housing 14 includes an air inlet 16 and an air outlet (not shown). Both the air inlet 16 and an air outlet are configured as a grill with a plurality of slot-like openings or the like formed in the exterior walls of the housing 14. The housing 14 includes a filter assembly cover (not shown) that is removable and has the air inlet formed therein. An exemplary air purifier is provided in U.S. Pat. No. 6,425, 932, the contents of which are herein incorporate by reference in its entirety.

The housing 14 includes an inner grate 18 having a plurality of slot-like openings positioned between the filter assembly 12 and the fan. The particular shapes of the openings are not deemed critical so long as they permit satisfactory throughput of air. The lower portion of the housing 14 can similarly include a plurality of slot-like openings positioned between the filter assembly 12 and the fan. In this configuration the air purifier 10 can accept a pair of filter assemblies 12.

The fan of the air purifier 10 includes an electric motor, which is preferably operable on alternating current, and a fan blade that is coupled to the electric motor by a drive shaft. The fan is positioned within the housing 14 so that air is drawn through the air inlet 16 and is expelled through the air outlet. The speed of the fan is controlled by a controller. The controller includes a logic circuit for adjusting the fan speed as a function of the filter type.

The filter assembly 12 includes a frame 20 and a filter element 22 mounted within the frame 20. The filter element 22 can take the form of commonly used filter elements such as; a basic filter, a high efficiency particulate air (HEPA) filter, expanded media filter, a washable filter, etc. The frame 20 has an exterior surface 24 including a top wall 26, first and second opposing side walls 28 and 30, and a bottom wall 32 defining a cavity 44. The filter element 22 is positioned within the cavity 44. The frame 20 is generally rectangular, but could include other shapes and sizes.

Figure 2:
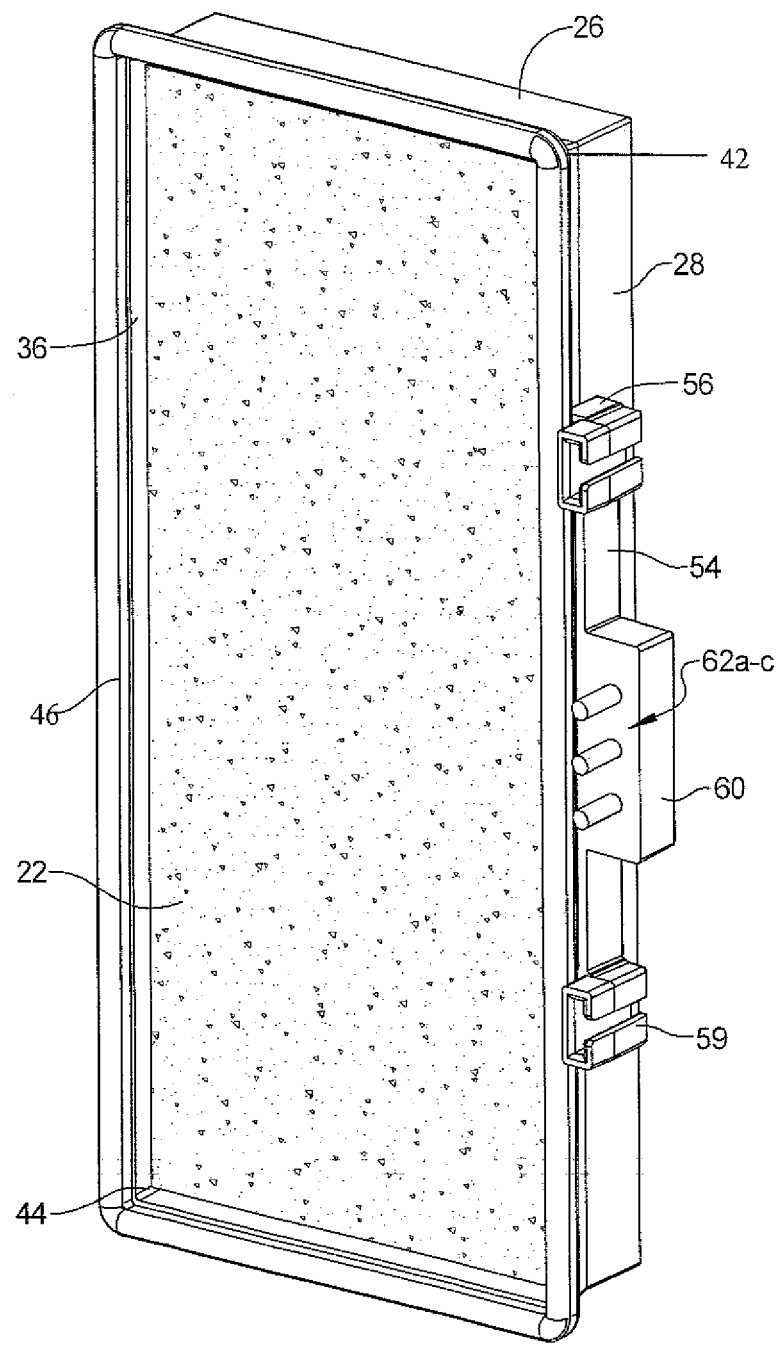
FIG. 2 depicts an isometric view of a filter assembly of the present disclosure.

Referring also to FIG. 2, the frame 20 includes an inlet end 34 and an outlet end 36. A support 38 can be coupled to the outlet end 36 of the frame 20. The support 38 can include a plurality of strap-like elements 40 which extend across the frame 20.

A seal 42 can be mounted to the outlet end 36 of the frame 20. The walls 26, 28, 30, and 32 of the frame 20 can have a perimeter 46 that is adapted to bear against the seal 42 when the filter assembly 12 and filter assembly cover are installed in the air purifier 10. A substantially air-tight seal is formed by the engagement of the seal 42 and housing 14. Operation of the fan tends to draw the frame 20 towards the housing 14, thereby enhancing the seal.

The filter assembly 12 also includes a plurality of hanger supports 50 for facilitating the connection to the hangers 52 on the housing 14 of the air purifier 10. The hangers 52 are attached to the housing 14 as a cantilever. The hangers 52 can include at least one rib which extends between a gap in the hanger supports 50. When the filter assembly 12 is mounted to the housing 14, the hangers 52 engage a respective hanger support 50 on the filter assembly 12.

Figure 3:
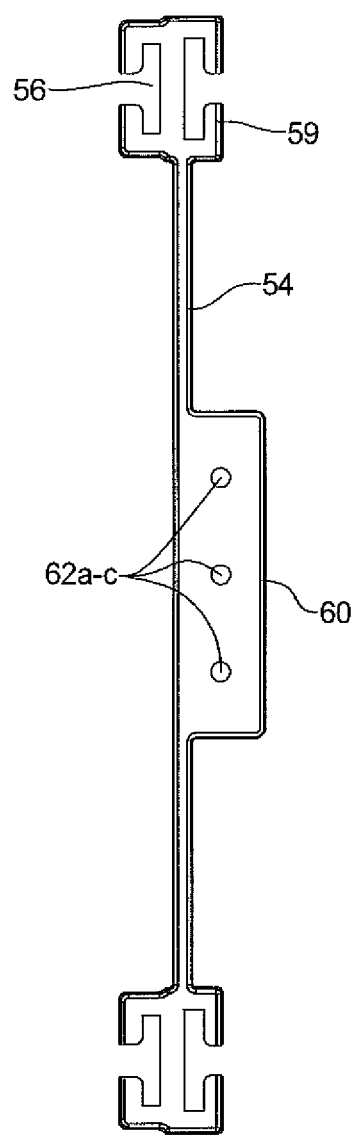
FIG. 3 depicts a side view of a hanger clip used on a filter assembly of the present disclosure.

Referring to FIGS. 2 and 3, a hanger clip 54 can be attached to the filter assembly 12. The hanger clip 54 includes a first set of hanger supports 56. The hanger supports 56 are attached to hanger tabs 58 on the frame 20 of the filter assembly 12. A second set of hanger supports 59 on the hanger clip 54 are attachable to the hangers 52 on the housing 14.

Figure 4:
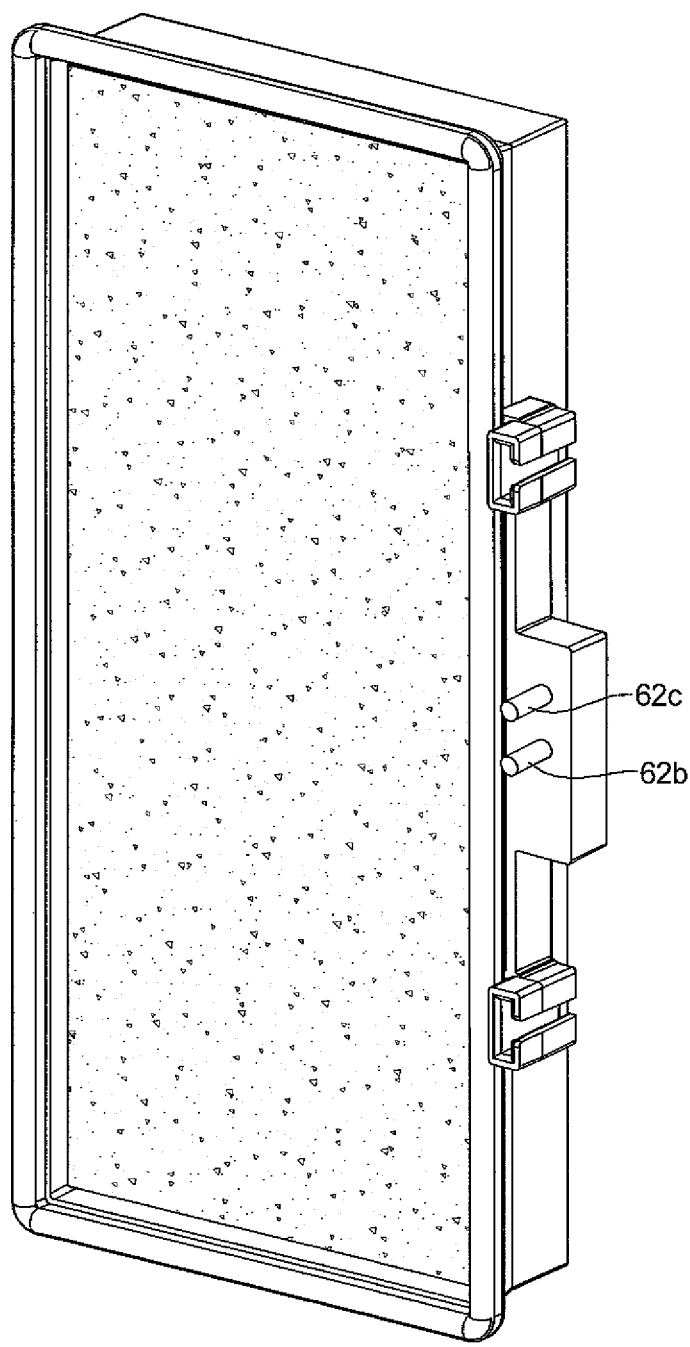
FIG. 4 depicts a filter assembly of the present disclosure including an alternative pin configuration.
Figure 5:
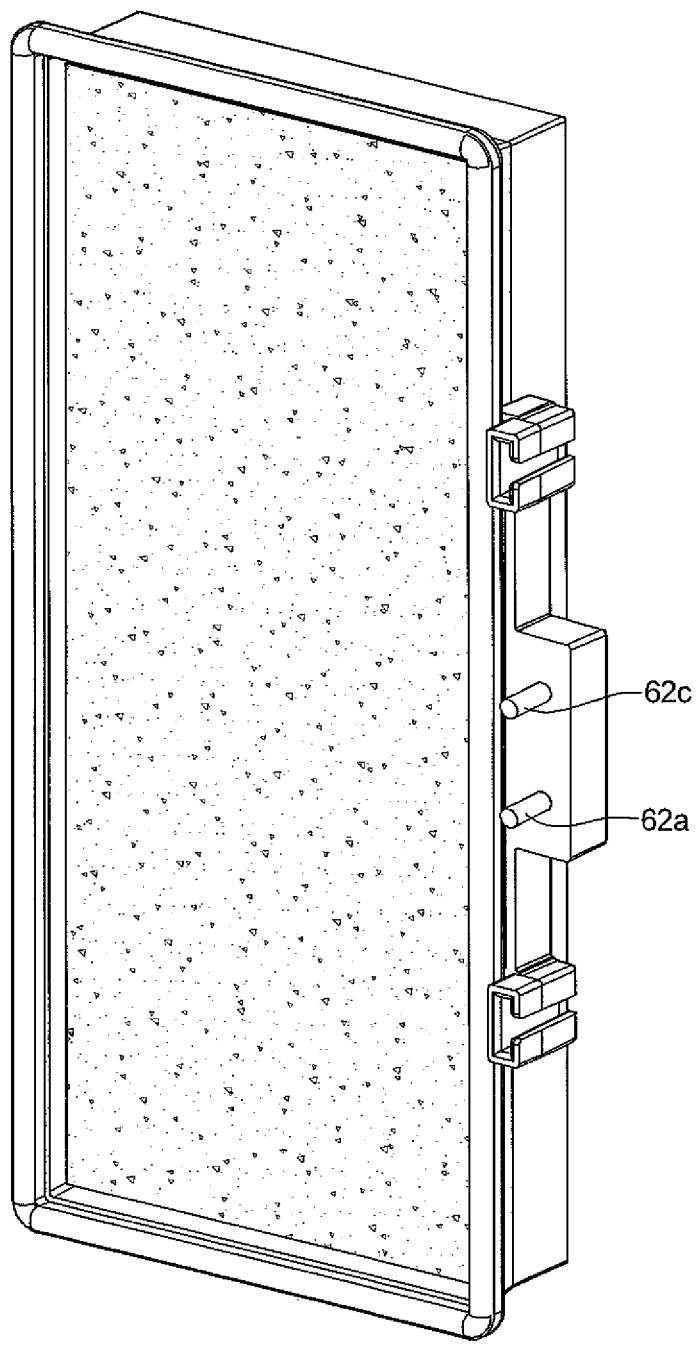
FIG. 5 depicts a filter assembly of the present disclosure including another alternative pin configuration.

The hanger clip 54 further includes a base portion 60 having a plurality of pins 62 a-c. The pin configuration, number and location of pins 62a-c, can be used to identify the type of filter element 22. As shown in FIG. 3, the base portion 60 includes a 3-pin configuration. The pins 62 a-c can be removable attached to the base portion 60 such that the pin configuration can be changed in relation to the filter type installed in the filter assembly 12. Referring to FIGS. 4 and 5, alternative two pin 62 configurations are provided.

Referring to FIG. 6, an exemplary pin configuration chart is provided. Based on a 3-pin configuration, the filter element 22 type is determined by the number and location of pins on the base portion 60. Using the 3-pin configuration, eight different filter types can be identified.

However, it is also contemplated that different pin configuration can be used to identify filter types, including by not limited too, 2-pin, 4-pin, 5-pin, etc.

Figure 7:
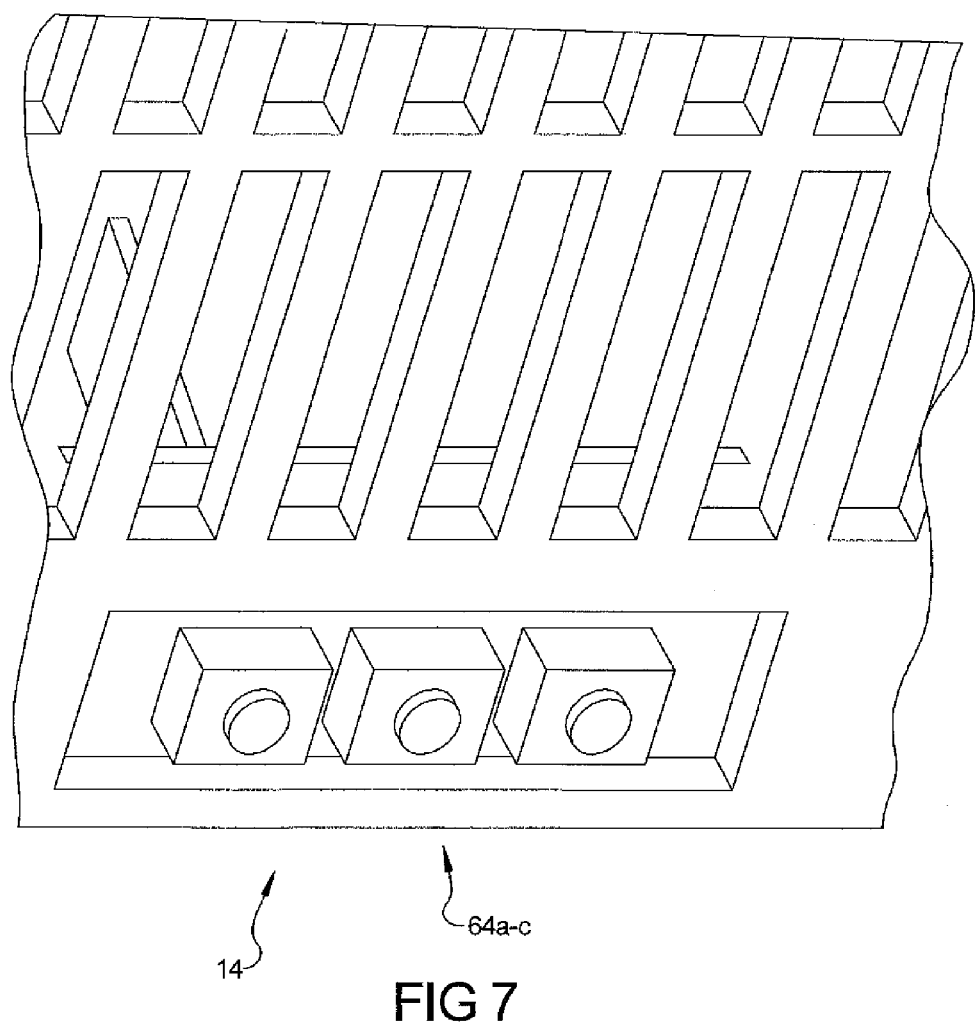
FIG. 7 depicts a set of tact switches on a housing of the air purifier.

Referring to FIGS. 1 and 7, upon filter assembly 12 placement in the housing 14, the pins 62 a-c on the base portion 60 of the hanger clip 54 engage a set of tact switches 64 a-c. Each of the tact switches 64 a-c corresponds to a pin 62 a-c on the base portion 60. The presence of a pin 62 a-c depresses the corresponding tact switch 64 a-c, indicating to the air purifier 10 the filter type in the filter assembly 12.

The logic circuit reads the depressed tact switches to identify the filter type. Based on the filter type, the logic circuit adjusts the speed of the fan to the optimal fan speed for the particular filter type. Additionally, the logic circuit adjusts the filter timer to automatically communicate to a user the recommended time to change the filter assembly 12 based on the identified filter type.

Figure 8:
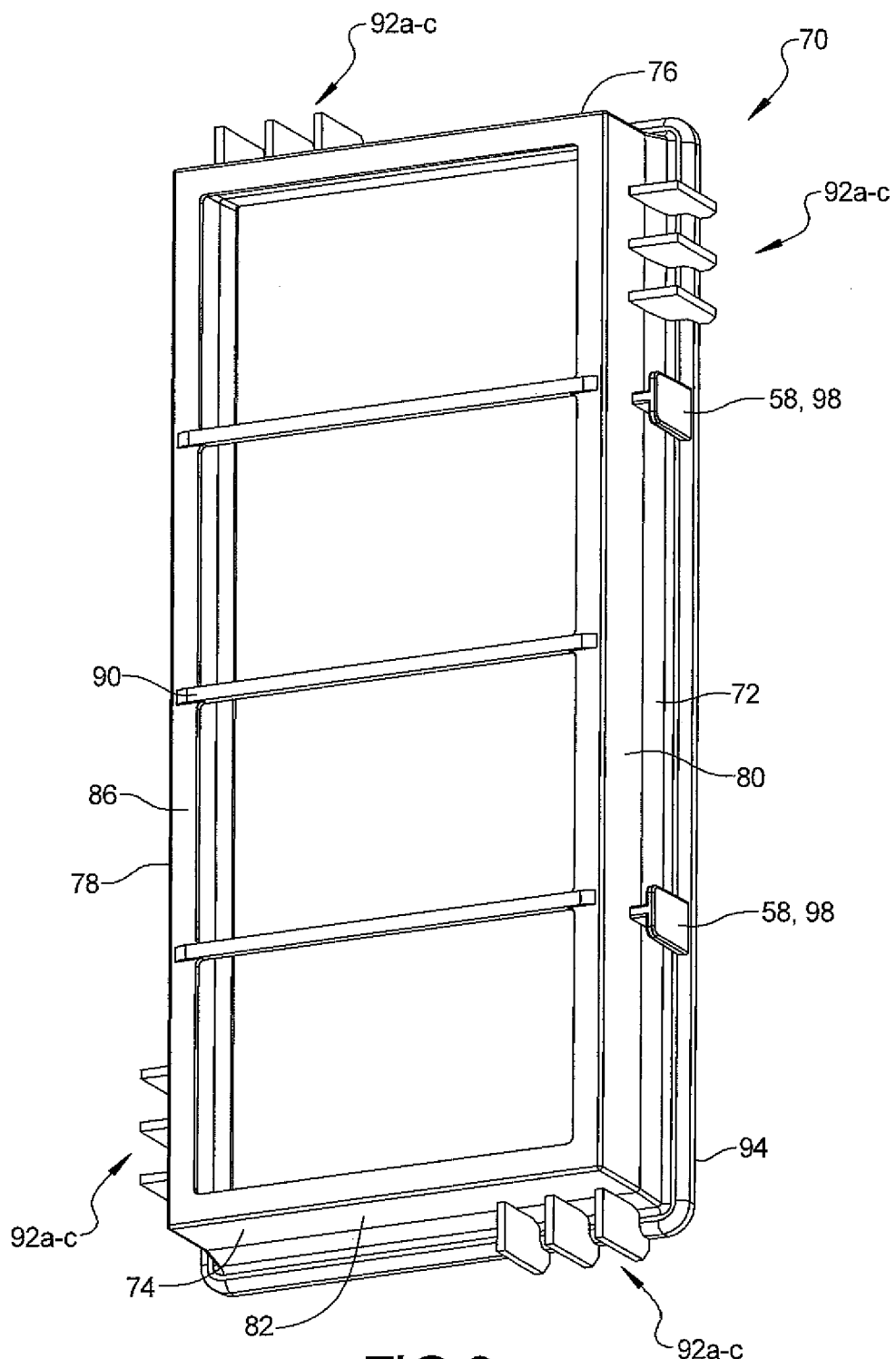
FIG. 8 depicts an isometric view of another filter assembly of the present disclosure.

Referring to FIG. 8, a filter assembly 70 can include a frame 72 configured to support a filter element 22. The frame 70 has an exterior surface 74 including top wall 76, first and second opposing side walls 78 and 80, and a bottom wall 82 defining a cavity 84 therein. The filter element 22 is positionable within the cavity 84. The frame 72 is generally rectangular, but could include other shapes and sizes.

A support 86 can be coupled to an inlet end 88 of the frame 72. The support 86 can include a plurality of strap-like elements 90 which extend across the frame 72.

As noted above, a seal can be positioned about the perimeter 94 of the frame 72. The perimeter 94 is adapted to bear against the seal when the filter assembly 70 and filter assembly cover are installed in the air purifier. A substantially air-tight seal is formed by the engagement of the seal 92 and housing 14. Operation of the fan tends to draw the frame 72 towards the housing 14, thereby enhancing the seal.

The frame 72 further includes a plurality of tabs 92 a-c positioned on at least one of the walls 76-82. The tabs can be provided in a 3-tab configuration. The tabs 92 a-c can be removably attached to the walls 76-82, such that the tab configuration can be changed to indicate to the type of filter element 22. FIG. 8 depicts the tabs 92 a-c installed on all of the walls 78-82. However, it is also completed that the tabs 92 a-c can install on a one, two, or three of the walls 76-82

Referring to FIG. 6, an exemplary pin/tab configuration chart is provided. Based on a 3-tab configuration, the filter type is determined by the number of tabs and the locations of tabs. If the tabs 92 a-c are installed on multiple walls, each of the walls will have identical tab configurations. Using the 3-tabs configuration, eight different filter types can be identified.

However, it is also contemplated, the different tab configurations can be used to identify filter types, including by not limited too 2-tab, 4-tab, 5-tab, etc.

Figure 9:
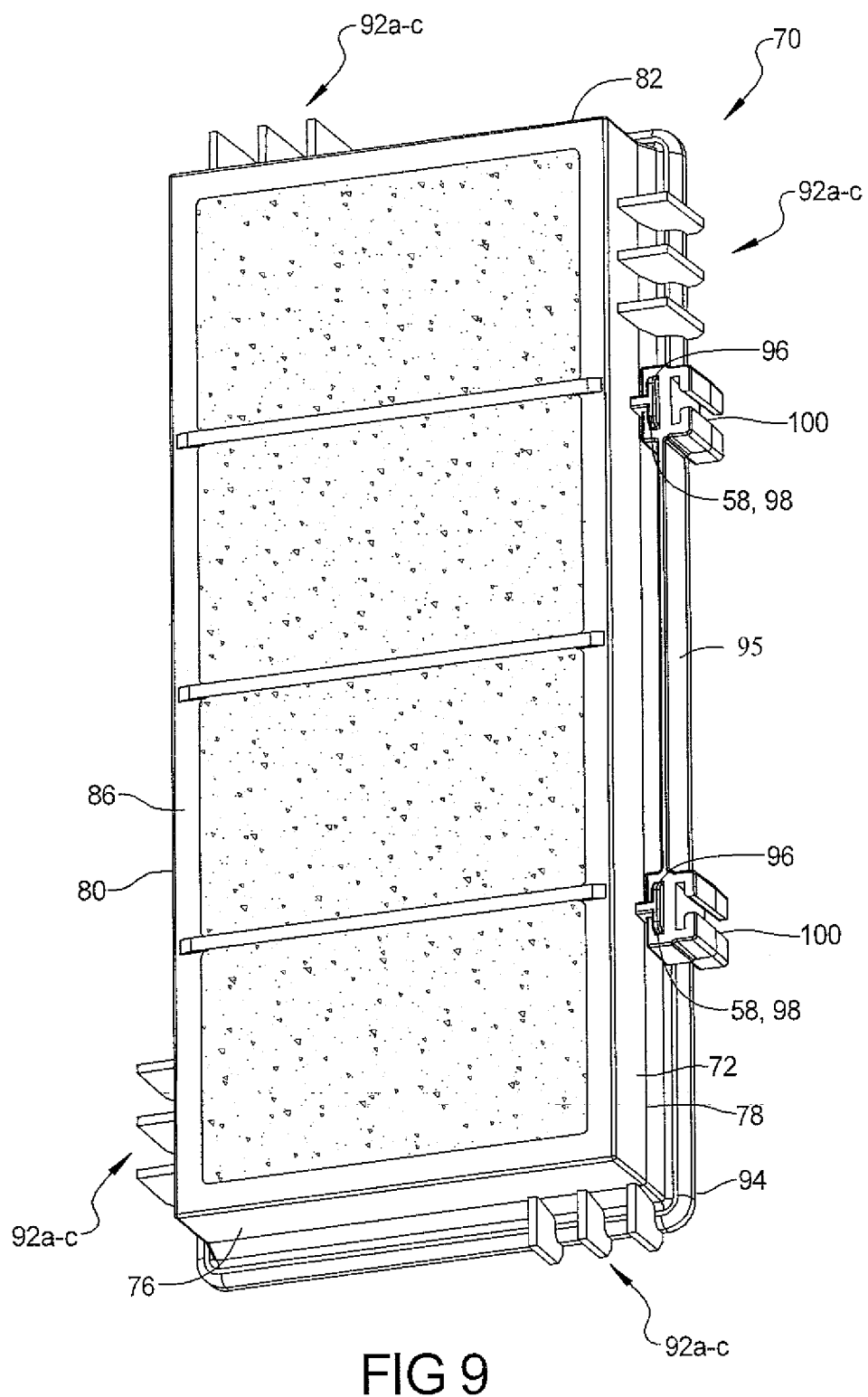
FIG. 9 depicts the filter assembly of FIG. 8 including a hanger clip.

Referring to FIG. 9, a hanger clip 95 can be attached to the filter assembly 70. The hanger clip 95 includes a first set of hanger supports 96. The hanger supports 96 are attached to hanger tabs 98 on the frame 72 of the filter assembly 70. A second set of hanger supports 100 on the hanger clip 95 are attachable to the hangers 52 on the housing 14. When the filter assembly 70 is mounted to the housing 14, the hangers 52 engage a respective hanger supports 100 on the hanger clip 95.

Figure 10:
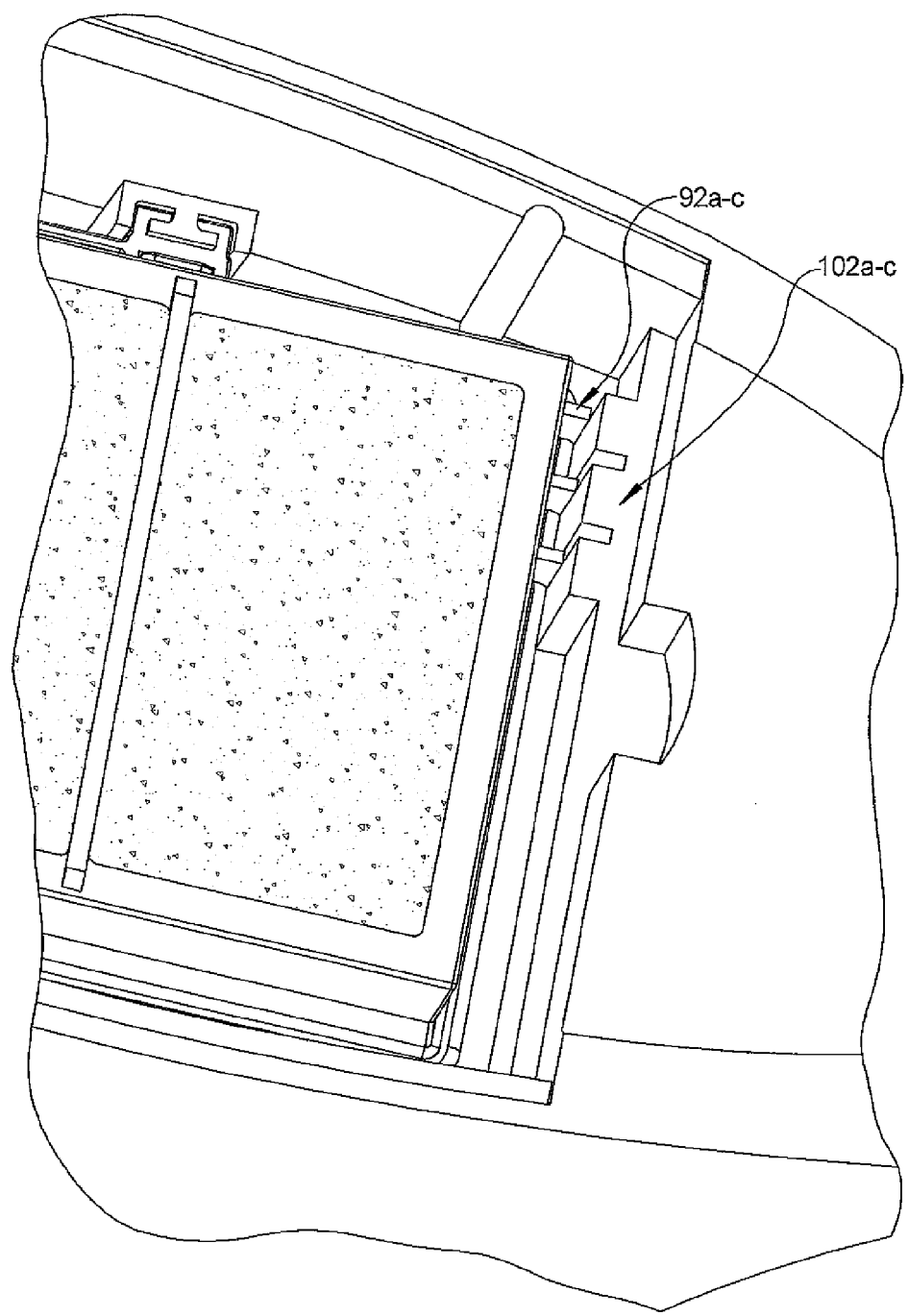
FIG. 10 depicts a set of switches on a housing of the air purifier.

Referring to FIG. 10, upon the filter assembly 70 placement in the housing 14, the tabs 92 a-c on the wall(s) 76-82 of the frame 72 engage corresponding set of switches 102 *a-c*. Each of the switches 102 *a-c* corresponds to a tab 92 *a-c* on a wall 76-82. The presence of a tabs 92 *a-c* activate the corresponding switch 102 *a-c*, indicating to the air purifier 10 the type of filter element 22 installed in the filter assembly 70.

The logic circuit reads the depressed switches 102 *a-c* to identify the filter element 22 type. Based on the filter type, the logic circuit adjusts the speed of the fan to the optimal fan speed for the particular filter type. Additionally, the logic circuit adjusts the filter timer to automatically communicate to a user the recommended time to change the filter assembly 70 based on the identified filter type.

Figure 11:
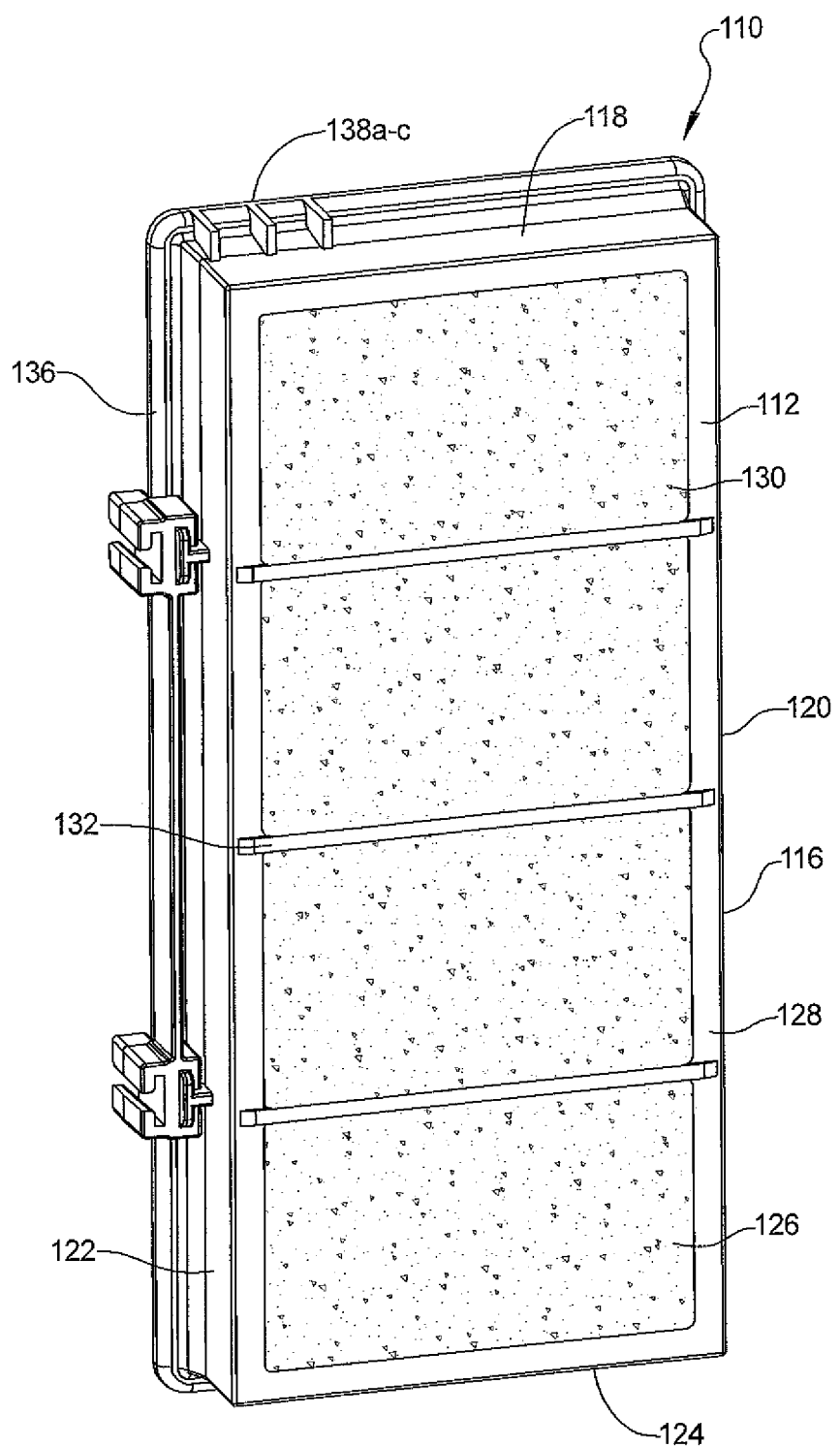
FIG. 11 depicts an isometric view of another filter assembly of the present disclosure.

Referring to FIG. 11, a filter assembly 110 can include a frame 112 configured to support a filter element 22. The frame 112 has an exterior surface 116 including top wall 118, first and second opposing side walls 120 and 122, and a bottom wall 124 defining a cavity 126 therein. The filter element 22 is positionable within the cavity 126. The frame 112 is generally rectangular, but could include other shapes and sizes.

A support 128 can be coupled to an inlet end 130 of the frame 112. The support 128 can include a plurality of strap-like elements 132 which extend across the frame 112.

As noted above, a seal can be positioned about the perimeter 136 of the frame 112. The perimeter 136 is adapted to bear against the seal when the filter assembly 110 and filter assembly cover are installed in the air purifier. A substantially air-tight seal is formed by the engagement of the seal and housing 14. Operation of the fan tends to draw the frame 112 towards the housing 14, thereby enhancing the seal.

The frame 112 further includes a plurality of tabs 138 *a-c* positioned the top wall 118. The tabs 138 *a-c* can be provided in a 3-tab configuration. The tabs 138 *a-c* can be removably attached to the top wall 118, such that the tab configuration can be changed to indicate to the type of filter element 22 installed in the filter assembly 112. While FIG. 11 depicts the tabs 138 a-c being positioned on the top wall 118, it is envisioned that the tab 138 *a-c* can alternatively be positioned one of the side walls 120 or 122, or the bottom wall 124.

Similarly, as shown in FIG. 10, upon the filter assembly 110 placement in the housing 14, the tabs 138 *a-c* on the top wall 118 of the frame 112 engage a set of switches 102 *a-c*. Each of the switches 102 *a-c* corresponds to a tab 138*a-c* on the top wall 118. The presence of a tab 138 *a-c* activate the corresponding switch 102 *a-c*, indicating to the air purifier 10 the type of filter element 22 install in the filter assembly 110.

The logic circuit reads the depressed switches 102 *a-c* to identify the filter type. Based on the filter type, the logic circuit adjusts the speed of the fan to the optimal fan speed for the particular filter type. Additionally, the logic circuit adjusts the filter timer to automatically communicate to a user the recommended time to change the filter assembly 110 based on the identified filter type.

Figure 12:
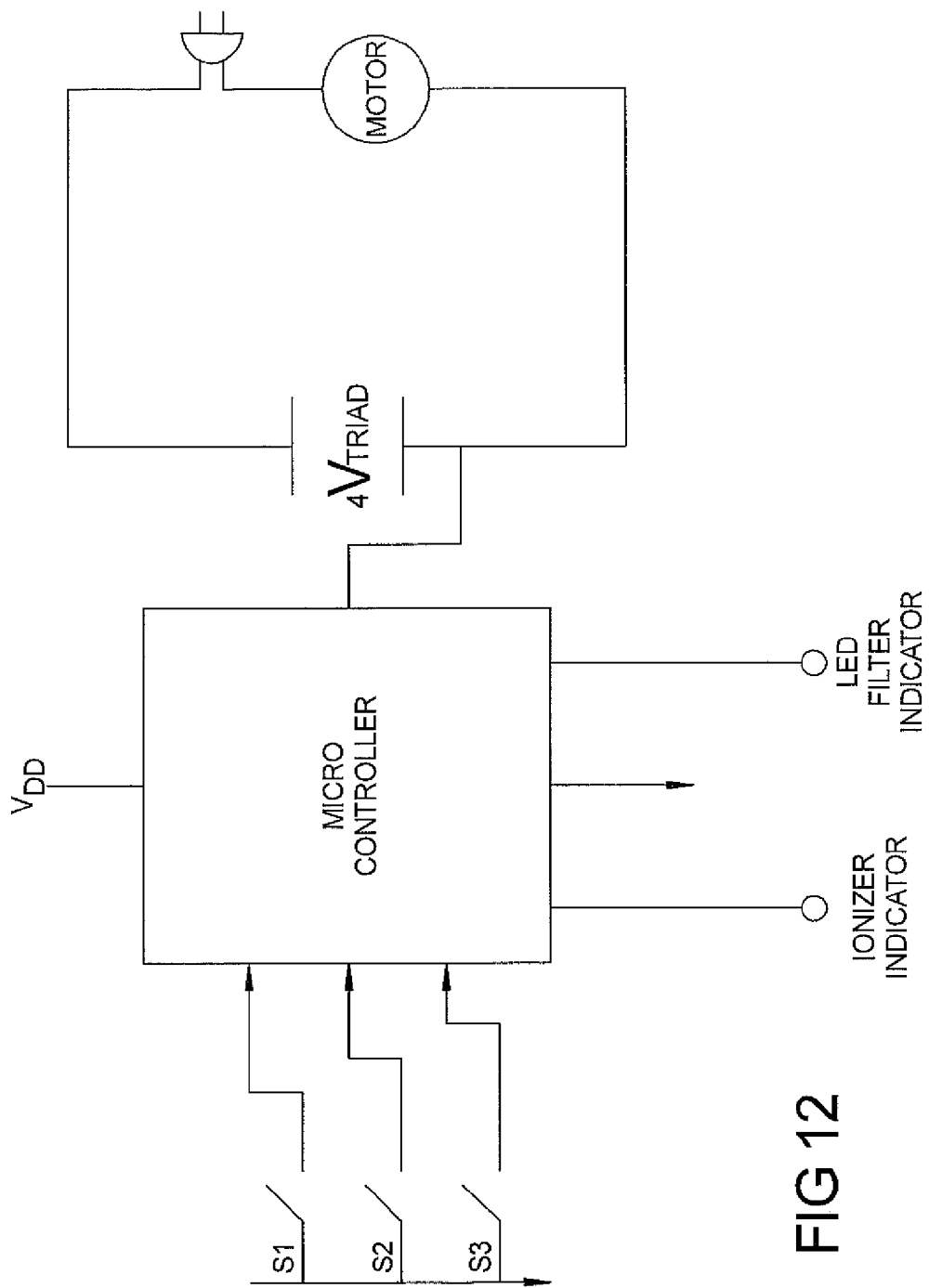
FIG. 12 is a circuit diagram of a controller of the present disclosure.

Referring to FIG. 12, the controller includes a micro-processor which receives inputs from the switched (S1, S2, S3). The switches are either in a open "0" or closed "1" position. Based on a 3-pin.tab configuration, the switch can provide the following signals to the micro-processor:

111=Basic Filter
    110=Odor Filter
    011=Standard HAP F30 Filter
    101=Standard HAP300 Filter
    100=HAP300 Filter with aqustat
    010=N/A
    001=Expanded Media Filter
    000=Washable Filter with Silver Betting The micro-processor is preprogrammed with the filter type identifications corresponding to a signal. Additionally, for each filter type the micro-processor include optimal fan speed and usage times. In this manner, upon the insertion of the filter assembly in the air purifier, the micro-processor can automatically set the optimal fan speed and filter life count for the identified filter type.

Figure 13:
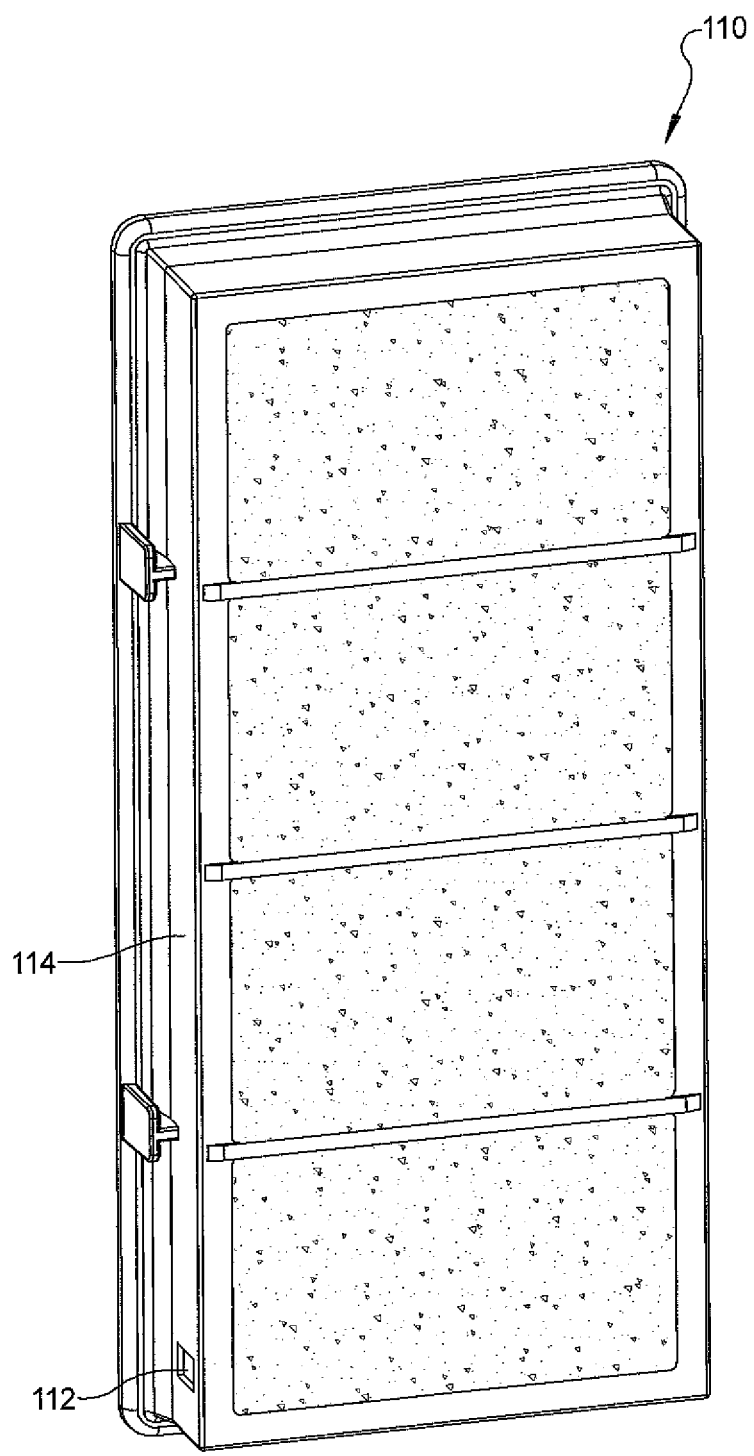
FIG. 13 depicts a filter assembly of the present disclosure including a RFID tag.

Referring to FIG. 13, in an alternative embodiment a filter assembly 110 can include a RFID tag 112 attached to or embedded in the frame 114 of the filter assembly 110. The RFID tag 112 can be an active RFID tag or a passive RFID tag. The RFID tag can transmit an identification signal encoded with filter type identifiers. For example, the RFID tag can be encoded with the following filter type identifiers:

111=Basic Filter
    110=Odor Filter
    011=Standard HAPF30 Filter
    101=Standard HAP300 Filter
    100=HAP300 Filter with aqustat
    010=N/A
    001=Expanded Media Filter
    000=Washable Filter with Silver Betting For an active RFIG tag, the air purifier 10 includes an RFID reader which can read an identification signal transmitted by the active RFID tag 112. The RFID reader provides the micro-processor with the filter type identifiers read from the RFID tag 112. The micro-processor is preprogrammed with the filter type identifier parameter for each filter type, including optimal fan speed and usage times. In this manner, upon the insertion of the filter assembly in the air purifier, the micro-processor can automatically set the optimal fan speed and filter life count for the identified filter type.

For a passive RFIG tag, the air purifier 10 includes a RFID activator and reader. The RFID activator transmits an energy signal to the passive RFID tag 112. The energy signal activates the passive RFID tag 112, which in turn transmits an identification signal which can be read by the RFID reader. The RFID reader provides the micro-processor with the filter type identifiers read from the RFID tag 112. The micro-processor is preprogrammed with the filter type identifier parameter for each filter type, including optimal fan speed and usage times. In this manner, upon the insertion of the filter assembly in the air purifier, the micro-processor can automatically set the optimal fan speed and filter life count for the identified filter type.

All references cited herein are expressly incorporated by reference in their entirety.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An air filter assembly for use with an air purifier comprising:
    a frame having an outer surface defining a cavity;
    a filter element positionable within the cavity of the frame;
    a filter identifier including at least one removable protrusion extending from the outer surface of the frame and configured to physically engage the air purifier, wherein a position of the at least one removable protrusion on the frame identifies to the air purifier the type of the filter element.

2. An air filter assembly for use with an air purifier as set forth in claim 1, wherein the position of the at least one removable protrusion on the frame is configured to identify a usable life span of the filter element.

3. An air filter assembly for use with an air purifier as set forth in claim 1, wherein the at least one removable protrusion includes at least one removable tab element.

4. An air filter assembly for use with an air purifier as set forth in claim 1, wherein the at least one removable protrusion includes at least one of removable pin element.

5. An air filter assembly for use with an air purifier as set forth in claim 1, the frame being substantially rectangular in shape having first, second, third, and fourth sidewall defining the outer surface, and the filter identifier positioned on at least one of the first, second, third, or fourth sidewalls.

6. An air filter assembly for use with an air purifier as set forth in claim 5, wherein the at least one removable protrusion includes plurality of removable tab elements.

7. An air filter assembly for use with an air purifier as set forth in claim 5, wherein the at least one removable protrusion includes plurality of removable pin elements.

8. An air filter assembly for use with an air purifier as set forth in claim 1, further including a hanger clip removably attached to the outer surface of the frame, the filter identifier being affixed on the hanger clip.

9. An air purifying device comprising:
a housing including an air inlet and an air outlet;
a fan including a motor and a fan blade positioned within said housing for drawing air into said housing through said air inlet and expelling air through said air outlet;
a filter recognition system including at least one contact switch and a logic circuit; and
a filter assembly positioned within said housing between said air inlet and said fan, said filter assembly including a filter element and a filter identifier including at least one removable protrusion configured to physically engage the at least one contact switch of the filter recognition system, wherein a position of the at least one removable protrusion on the filter assembly identifies a type of the filter element in the filter assembly.

10. An air purifying device as set forth in claim 9, wherein the position of the at least one removable protrusion on the frame is configured to identify a usable life span of the filter element.

11. An air purifying device as set forth in claim 9, wherein the at least one removable protrusion includes at least one removable tab element.

12. An air purifying device as set forth in claim 9, wherein the at least one removable protrusion includes at least one removable pin element.

13. An air purifying device as set forth in claim 9, wherein the filter assembly comprises:
a frame being substantially rectangular in shape having first, second, third, and fourth sidewall defining a cavity;
a filter element positionable within the cavity of the frame, the filter identifier positioned on at least one of the first, second, third, or fourth sidewalls.

14. An air purifying device as set forth in claim 13, wherein the at least one removable protrusion of the filter identifier includes at least one removable tab element.

15. An air purifying device as set forth in claim 13, wherein the at least one removable protrusion of the filter identifier includes at least one removable pin element.

16. An air purifying device as set forth in claim 13, further including a hanger clip removably attached to at least one of the first, second, third, or fourth sidewalls, the filter identifier being positioned on the hanger clip.

17. An air purifying device as set forth in claim 9, wherein the filter assembly comprises
a frame having an outer surface defining a cavity; and
a filter dement positionable within the cavity of the frame.

18. An air purifying device as set forth in claim 9, wherein the filter recognition system include at least one switch selectively engagable by the filter identifier.

19. An air filter assembly for use with an air purifier comprising:
a frame having an outer surface defining a cavity;
a filter element positionable within the cavity of the frame;
a hanger clip removably attached to the outer surface of the frame,
a filter identifier including a plurality of protrusions molded onto and extending from the hanger clip and configured to physically engage the air purifier, wherein the filter identifier is configured to identify the type of the filter element.

* * * * *